Dec. 5, 1967   R. H. COTHER   3,356,868
MEASURING SYSTEM

Original Filed July 29, 1963   2 Sheets-Sheet 1

INVENTOR.
ROBERT H. COTHER
BY Reed C. Lawlor
ATTORNEY

Dec. 5, 1967  R. H. COTHER  3,356,868

MEASURING SYSTEM

Original Filed July 29, 1963  2 Sheets-Sheet 2

INVENTOR,
ROBERT H. COTHER
BY Reed C. Lawlor
ATTORNEY

United States Patent Office 3,356,868
Patented Dec. 5, 1967

3,356,868
MEASURING SYSTEM
Robert H. Cother, Fullerton, Calif., assignor to Endevco Corporation, Pasadena, Calif., a corporation of California
Continuation of application Ser. No. 298,125, July 29, 1963. This application Feb. 15, 1967, Ser. No. 616,408
6 Claims. (Cl. 310—8.4)

This application is a continuation of Ser. No. 298,125, filed July 29, 1964, now abandoned.

This invention relates to measuring systems and more particularly to improvements in systems for amplifying the output of charge-generating sources such as piezoelectric transducers.

Though this invention may be employed in connection with other types of charge-generating sources, its most important applications now known make use of piezoelectric transducers that are employed for detecting variable forces or motions. An important application of the invention involves the detection and measurement of accelerations by means of a piezoelectric transducer. For this reason, to facilitate an understanding of the invention, it will be described herein with specific reference to systems that utilize piezoelectric accelerometers.

It is common to employ piezoelectric accelerometers to study the motion of vibrating objects. The vibrations that are usually studied often involve components having frequencies that extend over a wide range. In many such applications, it is desirable to measure accelerations accurately over a frequency range that extends from a few cycles per second to many thousand cycles per second. A piezoelectric accelerometer of the type which may be employed to measure such accelerations is shown, for example, in Patent No. 2,714,672. Other types of piezoelectric accelerometers that are suitable for such use are well known.

In a piezoelectric accelerometer, a piezoelectric element having two opposite parallel faces is mounted with one face firmly secured to a housing that is placed on an object under investigation and with the other face in contact with a mass, or inertial, member. When the object vibrates, the mass member tends to remain stationary, thus alternately compressing and expanding the piezoelectric element between the mass member and the housing. In this action, electric charges are developed on the opposite faces, thus causing electric voltages to be generated across the opposite faces in accordance with the acceleration.

In order to detect, measure, and record the acceleration, the piezoelectric element of the accelerometer is frequently connected across the input of an amplifier. For example, in order to make it possible to measure the amplitude of accelerations over the range of frequencies with an error no greater than 5% in that range, it is necessary for the product of the capacitance (C) of the accelerometer in microfarad ($\mu f$.) and the input resistance (R) of the amplifier in megohms to have a "high" value of the order of 3 times the period of the lowest frequency components to be detected.

A piezoelectric accelerometer inherently possesses a low capacitance such as 500 pf. For this reason, in order to detect signals having frequencies down to a low cut-off frequency (1/RC) such as 6 c.p.s., it is necessary for the input resistance of the amplifier to have a very high value, such as 50 megohms. In such a case substantially uniform response is customarily obtained down to only about 100 c.p.s. The use of amplifiers having such a high input resistance in such a circuit is fraught with many difficulties. For one thing, it is usually very difficult to maintain such a high input resistance for any great length of time, especially if the measuring system is used under a wide variety of ambient conditions rather than under highly controlled laboratory conditions. For example, the input resistance of such an amplifier may be reduced considerably by virtue of deposits of dust on the parts across which the input terminals are connected. Furthermore, the input resistance may drop considerably where the humidity is high. This is especially true where an amplifier may be exposed to "salt air" near an ocean. In such a case, the resultant reduction of the resistance introduces a loss in sensitivity at low frequencies. For example, if the value of the input resistance drops ten-fold, the cutoff frequency rises ten-fold. Such a change destroys the efficacy of the measuring system at low frequencies.

Another difficulty involved in the use of such a system resides in the fact that it is often desirable to connect a piezoelectric transducer to an amplifier located at a remote point by means of a cable that has a length which may vary in length by several hundred feet or more from one installation to another. As a result, the shunt capacitance of the cable may also vary by a great amount from one installation to another, thus affecting a great change in the cut-off frequency and a great loss of signal strength at all frequencies.

According to the present invention, the foregoing difficulties are overcome by employing an amplifier having a field effect transistor at its input and utilizing a capacitive negative feed-back circuit to render the input impedance of the amplifier capacitive over the range of frequencies of the signal components that are of interest.

Since the piezoelectric transducer with which the amplifier is used is intended to detect and measure acceleration and shock, the amplifiers themselves may introduce random disturbances caused by the motion which are to be detected and measured. In order to avoid erratic indications caused by vibration and shock, I employ a transistor of the diffused-junction type which has been hermetically sealed in dry gas in a container which is free of any loose solids such as dessicating powder or other powders employed for stabilizing the characteristics of the transistor.

In the best mode of practicing this invention now known, the input capacitance of the amplifier is made large compared with any changes that are likely to be encountered in the input capacitance due to the use of cables of different lengths, and the amplifier input capacitance is very large compared with the capacitance of the piezoelectric transducer itself and any cable that is expected to be used. Since the amplifier of this invention has a high input resistance as well as a large input capacitance and such a special field effect transistor at its input, uniform response is obtained to very low frequencies.

In my prior application, Ser. No. 810,733, a system has been disclosed that overcomes some of the foregoing difficulties but not as effectively as the system of the present application. My prior application discloses a system that employs a transistorized amplifier which utilizes capacitive negative feed-back to render the input impedance of the amplifier capacitive over a wide range of frequencies of the signal components that are of interest. But the specific amplifier disclosed in that application is of the type that has a low input resistance, though it has a large input capacitance.

The present invention represents an improvement in the system disclosed and claimed in my prior application, Ser. No. 810,733. This improvement makes it possible to provide a system which has a uniform response to even lower frequencies than that employing the transistorized amplifier disclosed in that prior application.

The foregoing and other advantages and features of this invention will be understood by reference to the following description taken in connection with the accompanying drawings wherein.

Figure 1:
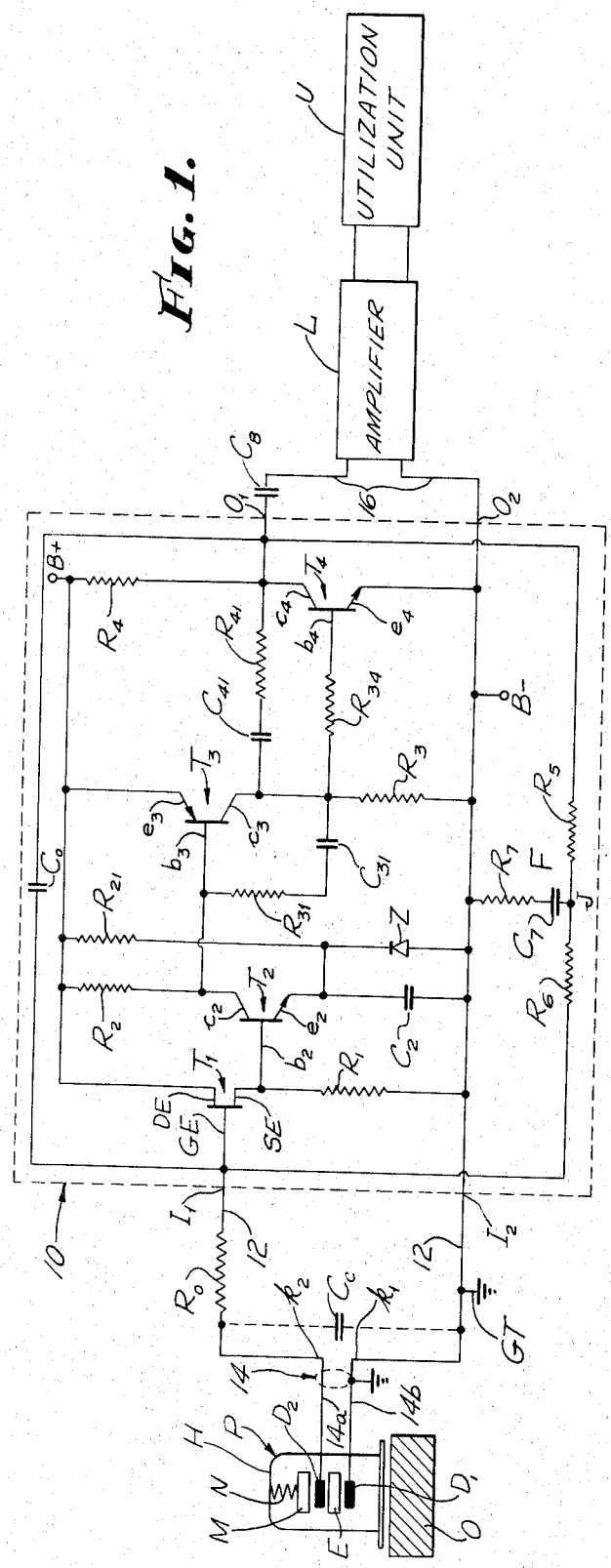
FIG. 1 is a diagram of a system embodying this invention.

Referring to the drawings and more particularly to FIG. 1, there is illustrated a system embodying this invention and employing an input amplifier 10 having a piezoelectric accelerometer P connected to its input 12 by means of a coaxial cable 14 and having an output amplifier L connected to its output and feeding a utilization unit U such as a recording oscillograph.

The piezoelectric accelerometer P employs a piezoelectric element that has two flat electrodes $D_1$ and $D_2$ on opposite parallel faces thereof and in electrical communication therewith. The piezoelectric element E may be of any kind generally employed in accelerometers, such as barium titanate ($BaTiO_4$) elements or Rochelle or quartz crystals. A spring N compressed between the mass M and the wall of the housing H firmly holds one electrode $D_1$ between the lower face of the piezoelectric element E and the accelerometer housing H, and the other electrode $D_2$ between the upper face of the element E and an inertial mass M.

In such a piezoelectric accelerometer P, electric charges Q are developed at the two electrodes $D_1$ and $D_2$ in response to compression or expansion of the crystal when the object O upon which the piezoelectric accelerometer is mounted is subjected to acceleration. The two charges developed at the respective electrodes are of equal amounts, but of opposite polarity. The magnitude of the strain S produced by such acceleration is proportional to the magnitude of the acceleration, and the magnitude of the charge Q developed is proportional to the strain. Thus for any given piezoelectric transducer $$Q = KS \quad (1)$$

where K is a constant. If no external circuits are connected across the electrodes $D_1$ and $D_2$, the voltage across the electrode is given by the formula $$E = \frac{Q}{C_a} \quad (2)$$

where $C_a$ = capacitance between the electrodes $D_1$ and $D_2$.

The cable 14, which includes two conductors 14a and 14b, is characterized by a shunt impedance between its conductors that is capacitive under the conditions of operation considered here. The effective shunt capacitance of the cable is represented by the lumped element $C_c$ of FIG. 1. In the absence of the amplifier 10, the effective source capacitance across the output of the cable is $$C_i = C_a + C_c \quad (3)$$

For this reason, the voltage actually appearing at the end of the cable and available for application to an amplifier, but prior to connection to the amplifier, is given by the following equation:

$$E_i = \frac{Q}{C_i} \quad (4)$$

It is thus seen that the voltage available for application to the amplifier depends upon the shunt capacitance of the cable and hence on the length of the cable as well as on the capacitance of the accelerometer P. A typical value for the capacitance of a cable is 30 pf./ft. Clearly, when employing a typical accelerometer which may have a capacitance of 100 pf. to 1000 pf., serious errors may arise where cables of different lengths are used. These difficulties are obviated by the use of a transistor amplifier 10 that as an input impedance which is substantially capacitive and which is high compared with the capacitance of the transducer and cable together.

The input amplifier 10 has two input terminals $I_1$ and $I_2$ and two output terminals $O_1$ and $O_2$. A transistor $T_1$ which is of the diffused-junction, field effect type is connected at the input. This transistor is connected as a source follower. Additionally, the amplifier employs three ordinary transistors $T_2$, $T_3$, and $T_4$ which are arranged to amplify alternating current signals supplied at the output of the field effect transistor $T_1$ in response to charges generated in the piezoelectric accelerometer P. The transistors $T_2$ and $T_4$ are of the npn type while the transistor $T_3$ is of the pnp type and they are connected with complementary symmetry. Electric power from a low voltage source (not shown) is employed to energize the transistors, the positive terminal of the low voltage source being connected to the B+ terminal and the negative end of the voltage source being connected to the grounded B— terminal indicated in FIG. 1.

A feed-back capacitor $C_0$ is connected between the output terminal $O_1$ and the input terminal $I_1$ to provide negative feed-back. In addition, low pass filter F is connected between the output terminal $O_1$ and the input terminal $I_1$ to provide negative feed-back at very low frequencies and at DC. This circuit stabilizes the operation of the amplifier and, in particular, minimizes long period drift in the characteristics of the field effect transistor. The two feed-back circuits cooperate to extend to very low frequencies the range of frequencies in which the amplitude-versus-frequency response is nearly uniform.

The field effect transistor includes a grid or gate electrode GE, a drain electrode DE, and a source electrode SE. The grid electrode GE is connected directly to the input terminal $I_1$. The drain electrode DE is connected directly to the positive terminal B+ while the source electrode SE is connected to the negative terminal B— through a source-follower resistor $R_1$. The source electrode SE is also connected directly to the base $b_2$ of the transistor $T_2$ while the collector $c_2$ of the second transistor $T_2$ is connected to the B+ terminal through a load resistor $R_2$. The emitter $e_2$ of this transistor is connected to the ground terminal GT through a parallel network consisting of a Zener diode Z and a shunt capacitor $C_2$. A bleeder resistor $R_{21}$ is connected in series with the Zener diode Z between the voltage terminals B+ and B— in order to establish the voltage of the Zener diode Z at an operating point such that the voltage thereacross is substantially constant throughout the range of operation of the amplifier.

In practice, the transistor $T_2$ operates at very low current so that its base-to-emitter resistance is very high thus enabling voltage changes applied to the grid electrode GE to appear across the base $b_2$ and emitter $e_2$ of the transistor $T_2$. This voltage is amplified by the transistor $T_2$ and the amplified voltage is applied to the base $b_3$ of the transistor $T_3$ which is connected to the collector $c_2$ of the transistor $T_2$. The emitter $e_3$ of the transistor $T_3$ is connected to the B+ terminal while the collector $c_3$ of the transistor $T_3$ is connected through a load resistor $R_3$ to the B— terminal. The output of the transistor $T_3$ which appears at the collector $c_3$ is applied through a resistor $R_{34}$ to the base $b_4$ of the transistor $T_4$. The emitter $e_4$ of this transistor is connected to the B— terminal while the collector $c_4$ is connected through an output load resistor $R_4$ to the B+ terminal. The amplified signal appearing at the collector $c_4$ of the transistor $T_4$ appears across the output terminals $O_1$ and $O_2$.

A resistor $R_{31}$ and a capacitor $C_{31}$ are connected in series between the collector $c_3$ and the base $b_3$ of the transistor $T_3$ in order to prevent oscillation of the amplifier at high frequencies. Similarly, a resistor $R_{41}$ and a capacitor $C_{41}$ are connected in series with the resistor $R_{34}$ between the collector $c_4$ and the base $b_4$ of the transistor $T_4$ for the same purpose.

The stabilizing filter F employs two series resistors $R_5$ and $R_6$ connected directly between the output terminal $O_1$ and the grid element GE of the field effect transistor $T_1$. It also includes a resistor $R_7$ and a capacitor $C_7$ connected in a shunt arm between the ground terminal GT and the junction J between the series resistors $R_5$ and $R_6$.

In the operation of this system a charge generated by the accelerometer P provides a voltage that is impressed across the input terminals $I_1$ and $I_2$ of the amplifier 10. In effect, this voltage is applied between the grid element GE and the ground terminal GT and the output of the field effect transistor $T_1$ is applied across the effective impedance provided by the base-to-emitter resistance of the transistor $T_2$ and the parallel impedance provided by the Zener diode Z and the shunting capacitance $C_2$. The latter impedance is very small and may be neglected in the frequency range of operation. The effective resistance between the grid electrode GE and the source electrode SE of the field effect transistor $T_1$ is exceedingly high. With this arrangement, the voltage impressed upon the input terminals $I_1$ and $I_2$ is reproduced between the base $b_2$ of the transistor $T_2$ and the lower input terminal $I_2$. By employing the field effect transistor $T_1$ in the source-follower mode an impedance matching effect is achieved in that the voltage applied across the high-resistance input is then reproduced across the low resistance that is effectively present between the base and emitter of the transistor $T_2$. This results in power amplification which is useful in connection with the operation of the amplifier provided by the three transistors $T_2$, $T_3$, and $T_4$ and their interconnections.

It can be shown that the total effective capacitance at the input of the amplifier is $$C_{\text{eff}} = C_1 + (1-A)C_0 \quad (5)$$

where $C_0$ = capacitance of the feedback capacitor $C_0$
$A$ = amplification of the input amplifier 10 without the feedback capacitor $C_0$ connected.

Likewise it can be shown that the effective input resistance looking into the amplifier 10 is given by the formula $$R_{\text{eff}} = \frac{R_0(R_5+R_7)}{(1-A)R_7} + \frac{R_5 R_7}{R_5+R_7} \quad (6)$$

in the frequency range in which the reactance of the capacitor $C_7$ is negligible where $R_5$ = the resistance of the series resistor $R_5$ that is connected to the output terminal $O_1$
$R_6$ = the resistance of the series resistor $R_6$ that is connected to the input terminal $I_1$
$R_7$ = the resistance of the shunt resistor $R_7$.

In practice the values of the resistances of the resistors $R_5$, $R_6$, and $R_7$ are related in accordance with the following inequality relations:

$$R_7 \ll R_5 \ll R_6 \quad (7)$$

It is to be noted that the grid-to-source resistance $R_{GS}$ of the field effect transistor $T_1$ does not appear in Equation 6. The reason for this is that it is normally very much higher than the resistance $R_6$ namely, the resistance which, in effect, is shunted across the input between the terminals $I_1$ and $I_2$.

In an actual case which has proved to be effective, the circuit elements had the following characteristics:

$T_1$ = Amelco FE 202
$T_2$ = 2N910
$T_3$ = 2N861
$T_4$ = 2N910
$R_0$ = 220$\omega$
$R_2$ = 4.7$k\omega$
$R_3$ = 1.5$k\omega$
$R_4$ = 2$k\omega$
$R_5$ = 470$k\omega$
$R_6$ = 15$m\omega$
$R_7$ = 15$k\omega$
$R_{21}$ = 3$k\omega$ $R_{31}$ = 1.5$k\omega$
$R_{34}$ = 220$k\omega$
$R_{41}$ = 470$\omega$
$C_0$ = 560 pf.
$C_2$ = 2.2 $\mu$f.
$C_{31}$ = 510 pf.
$C_{41}$ = 510 pf.
$C_7$ = 22 $\mu$f.
Z = 1N755
B— = 0 v.
B+ = 11.5 v.

where:

$\omega$ = ohms
$k\omega$ = kilohms
$m\omega$ = megohms
$\mu$f. = microfarads
pf. = picofarads In practice it is found desirable to select a field effect transistor, a source follower resistor $R_1$, and a Zener diode Z which have characteristics suitably matched to provide satisfactory operation. To this end for example, when a Zener diode having a characteristic breakdown voltage of 7 volts is employed, the value of the resistor $R_1$ is so selected in relationship to the current flowing through the source electrode SE as to establish a normal voltage of about 7.5 volts on the base $b_2$ of the transistor $T_2$. Usually, transistors are selected which are characterized by source electrode currents in such a range that the resistor $R_1$ is between about 20 $k\omega$ and 100 $k\omega$. Transistors are also selected in which the minimum drain-to-gate breakdown voltage is 20 volts, and the total gate leakage is about 0.3 nanoampere, the transconductance at about 5K c.p.s. is between 350 and 1000 micromhos and the pinch-off voltage is less than about 12 volts at about 20° C. In addition, a field effect transistor is selected for which the total gate current is less than 100 nanoamperes at 125° C. For optimum results, field effect transistors producing low noise of electronic origin are chosen. With field effect transistors and source follower resistors $R_1$ and Zener diodes Z selected in this way, uniform response can be obtained from about 1 c.p.s. to about 10,000 c.p.s. and above over a wide temperature range.

With a piezoelectric accelerometer and cable having a capacitance of $C_1$ = 550 pf. and with such an input transistor operating at a point where its grid-to-source resistance $R_{GS}$ is about 50 megohms or higher, the values of the effective input capacitance and input resistance of the system are as follows:

$C_{\text{eff}} \cong 0.56$ $\mu$f.
$R_{\text{eff}} \cong 3.0$ $m\omega$

Figure 2:
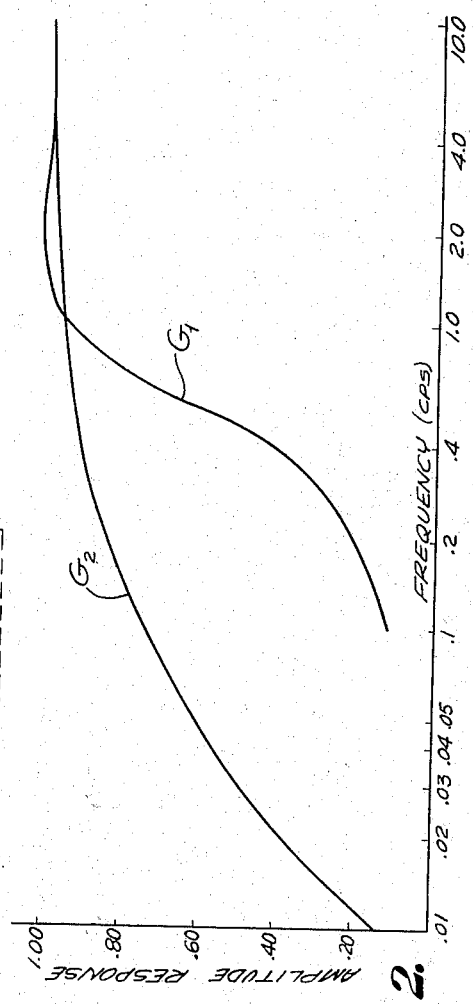
FIG. 2 is a graph of amplitude-versus-frequency characteristics of part of the system.

The amplitude-versus-frequency characteristic of such a system including accelerometer P and amplifier 10 is indicated in graph $G_1$ of FIG. 2. Here, it will be noted that the charge-to-voltage transducer provided by the piezoelectric accelerometer P and input amplifier 10 has a sharp cutoff below about 1 c.p.s.

The output amplifier L is a DC amplifier which is coupled to the output of the input amplifier 10 through a coupling capacitor $C_8$. In a particular arrangement in which the capacitance of the coupling capacitor $C_8$ was 120 $\mu$f. and the resistance looking into the output amplifier L was 2.5 $k\omega$, the overall amplitude-versus-frequency characteristic introduced by the output amplifier L and the capacitor $C_8$ was as shown in graph $G_2$. The combined effect of the two amplifiers is such that the response of the system is substantially uniform (that is within about ±2%) down to about 1.5 c.p.s. This result is achieved partly by virtue of the fact that the amplitude-versus-frequency characteristic for the input amplifier rises slightly below about 5 c.p.s. thus compensating for the slight attenuation introduced by the output amplifier L and coupling capacitor $C_8$ between 5 c.p.s. and 1 c.p.s. This slight rise is achieved by suitable proportioning of the values of the impedances in the DC feedback circuit F in relationship to the value of the feedback capacitor $C_0$ and the effective input resistance of the input amplifier 10 in the absence of feedback.

In order to make it possible to provide a charge-to-voltage amplifier having a uniform amplitude-versus-frequency characteristic to such a very low cutoff frequency and which is highly stable in operation and which is also free of disturbances that might otherwise arise because of the fact that the motions that affect the accelerometer P may also affect the amplifier 10, a field effect transistor of a special type is employed. More particularly the field effect transistor is of the diffused-junction type which has been passivated and which has been sealed against exposure to the atmosphere, being sealed in a container that is free of any loose particles. Such a transistor is of the general type indicated in FIGS. 3, 4, 5, 6, and 7. While the transistor $T_1$ identified above is not precisely of the same construction, nevertheless it is of the same general type.

Figure 3:
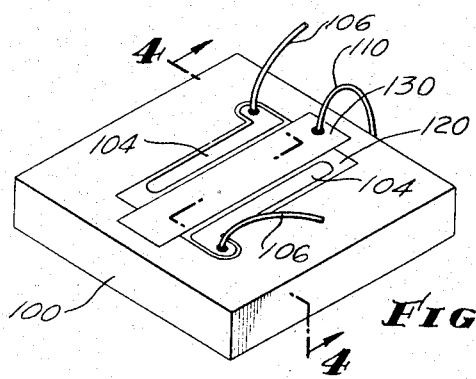
FIG. 3 is a perspective view of a field effect transistor of a type employed in the practice of this invention.
Figure 4:
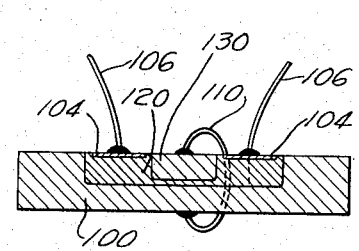
FIG. 4 is a cross-sectional view taken on the line 4—4 of FIG. 3.

As indicated in FIG. 3, the field effect transistor comprises a solid body member 100 composed of p-type semiconductive material such as silicon "doped" with an appropriate microscopic quantity of doping material such as boron, aluminum, gallium, or indium. A thin layer 120 of n-type material is formed by diffusion to form a channel element. The upper side of this layer 120 is filled with a thin layer of p-type semiconductive material diffused into place to form a grid element. The channel of n-type semi-conductive material is formed by first diffusing a doping material such as phosphorus, arsenic, or antimony into the upper surface of the body 100 in a generally rectangular area. The thin layer 130 of p-type material is formed by diffusing doping material such as boron, aluminum, gallium, or indium into the upper side of the layer 120 within the boundaries thereof as indicated in FIG. 3. An insulating coating is then formed on the upper surface by passivation. Such a passivated coating may be formed, for example, by heating the entire unit 90 to an elevated temperature in an atmosphere of water vapor and hydrogen. In this process, some of the silicon on the outer portion on the upper surface of the unit is converted to an oxide analogous to glass. Then the portions of the passivated coating covering the channel material on opposite sides of the layer 130 of p-type material are etched away and these etched areas are coated with gold, aluminum, or some other suitable material in order to form ohmic resistances 104 to which the leads 106 are then bonded.

Figure 5:
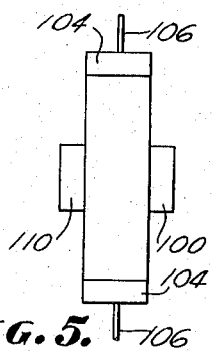
FIG. 5 is a schematic diagram of such a field effect transistor.

The ohmic contacts 104 formed, for example, of gold or aluminum are deposited by evaporation at the ends of the U-shaped channel and are arranged to contact the channel 120 but not the underlying body member 100 or each other. Aluminum terminal wires 106 are bonded to these terminals in order to provide connections for the source element SE and drain element DE. An aluminum wire is also bonded to a layer 130 of p-type material within the channel over the layer 120 of n-type material. This aluminum wire 110 is also bonded to the underlying body member 100. The two bodies of p-type material thus form parts of a grid element GE that lie on opposite sides of the channel provided by the layer of n-type material 120. Schematically, the arrangement is indicated in FIG. 5.

Figure 6:
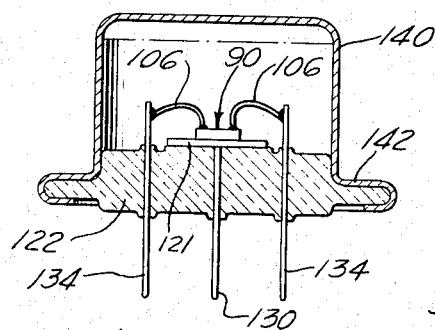
FIG. 6 is a schematic cross-sectional view of a field effect transistor unit.
Figure 7:
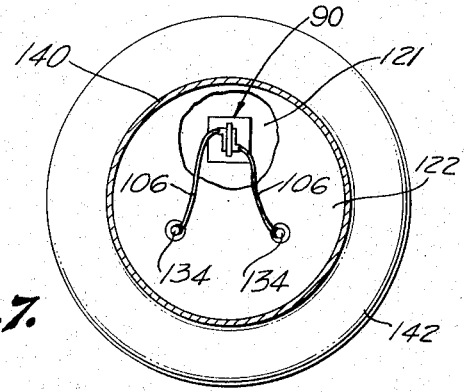
FIG. 7 is a plan view of a part of that unit.

In the best embodiment of the invention the transistor 90 of FIG. 3 is mounted in a hermetically sealed container and is provided with terminals as indicated in FIGS. 6 and 7. In practice the transistor 90 is bonded to a metallic disc 121 centered in a glass base 122. The two aluminum leads 106 are connected respectively to terminal wires 134 that extend through the glass base 122 and the disc 121 is connected to an aluminum lead 130 also extending through the glass base 122. A metallic case 140 is hermetically sealed to the glass base 122. In practice the case 140 is mounted in place in a moisture-free atmosphere of an inert gas or air.

Figure 10:
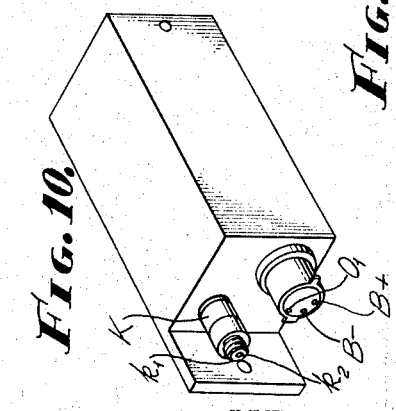
FIG. 10 is a perspective drawing of an amplifier of this invention.

When such a transistor is employed the outer surface of the glass base 122 is protected against contamination in order to minimize alterations in the characteristic of the unit that might otherwise be caused by the oxposure of these wires to the atmosphere. To this end the entire amplifier 10 is imbedded, that is "potted," within insulating material and the potted amplifier is placed within a hermetically sealed metal case through which mutually insulated and widely spaced apart terminals $O_1$, B+, and B— project, as illustrated schematically in FIG. 10. In practice, the grounded output terminal $O_2$ and the grounded input terminal $I_2$ are connected to the outer terminal $k_1$ of the coaxial connector K, which, in turn, is connected to the case and grounded. Also in practice, the input terminal $I_1$ (not shown in FIG. 10) is connected through the resistor $R_0$ to the central terminal $k_2$ of the coaxial connector K, the resistor $R_0$ also being potted in the case.

Figure 8:
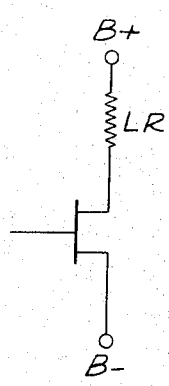
FIG. 8 is a schematic diagram employed in explaining the operation of such a transistor.
Figure 9:
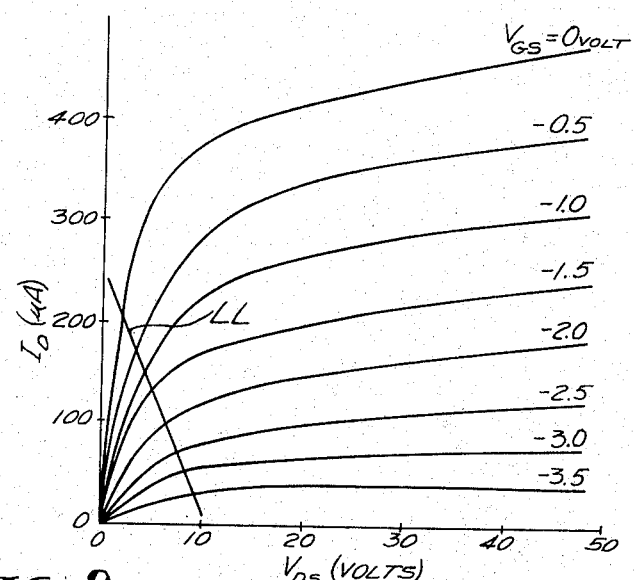
FIG. 9 is a graph used in explaining the operation of such a transistor.

While many different kinds of field effect transistors are available and are suitable for my purpose, I have found the Amelco FE 202 transistor very satisfactory. Such a transistor has a characteristic generally indicated in FIG. 9. Here, abscissae represent source-to-drain voltage, ordinates represent source-to-drain current, and the various graphs correspond to various parametric values of grid voltages, as indicated, that is, voltages applied between the grid element GE and the drain element DE. In practice, when a load resistor LR is connected between the drain element and the voltage supply as indicated in FIG. 8, the transistor operates along a load line indicated by the straight line LL indicated in FIG. 7. However, when operated as a source follower with a resistance between the source and the negative terminal B— small compared with the internal resistance of the transistor between the grid element GE and the source element SE as in FIG. 1, the voltage applied between the grid element and the negative terminal B— is transferred directly to the load circuit between the source element SE and the terminal B—.

It is thus seen that by employing a field effect transistor of the type described in a DC amplifier having a negative feedback circuit consisting of a capacitive element $C_0$ and another negative feedback circuit of the DC type, it is possible to provide a charge-to-voltage amplification which is very nearly uniform to exceedingly low frequencies of about 1 c.p.s. and which is highly stable and free of noise of a vibratory origin when in operation. It will be appreciated in view of the foregoing disclosure that the invention may be practiced in many other forms than that specifically described. It is therefore to be understood that many alterations may be made therein without departing from the scope of the invention as defined by the appended claims.

The invention claimed is:

1. In a charge to voltage transducing system:
    a piezoelectric transducer including a piezoelectric element and having an output at which a variable charge is generated to provide a source signal in accordance with the magnitude and sign of the displacement of one part of the piezoelectric element relative to another;
    an amplifier having an input and an output and including an input stage connected to receive said source signal from said transducer output, said input stage comprising a field effect transistor having a grid element, a source element, and a drain element, said grid element being connected in said amplifier input for varying the magnitude of the signal appearing at said amplifier output in accordance with the variable charge generated by said piezoelectric transducer; and a negative feedback circuit including a capacitor connected between said amplifier output and said amplifier input for rendering the impedance looking into said input primarily capacitive over a predetermined range of frequencies;

the input capacitance of said amplifier with such feedback being very large compared with the combined capacitance of said transducer and the connections thereof to said amplifier in said frequency range whereby the signal appearing at the output of said amplifier is substantially proportional to the quantity of charge appearing at the output of said transducer over said frequency range the time constant at the input of said amplifier formed by the resistance looking into said field effect transistor and the total effective capacitance connected thereto having a high value such that said voltage transducing system has a cutoff at a very low subaudio frequency and substantially uniform response at frequencies in a range above said low frequency and up to a very high frequency.

2. In a charge to voltage transducing system as defined in claim 1 wherein:
said field effect transistor is of the diffused-junction type.

3. In a charge to voltage transducing system as defined in claim 1 wherein:
an additional amplifier is connected to the output of said first mentioned amplifier, said additional amplifier having a substantially uniform response in said frequency range.

4. In a system for detecting vibration,
a piezoelectric accelerometer responsive to vibrations, said accelerometer including a piezoelectric element arranged to be subjected to a force in accordance with such vibration, said accelerometer developing at its output an electric charge that varies in accordance with the magnitude and sign of such force;

an amplifier having an input connected to the output of said accelerometer and having an output, said amplifier having a field effect transistor connected in its input, said field effect transistor having a grid element, a source element, and a drain element, said grid element being connected in said amplifier input, for varying the magnitude of the signal appearing at said amplifier output in accordance with the variable charge generated by said piezoelectric transducer; and a negative feedback circuit including a capacitor connected between said amplifier output and said amplifier input for rendering the impedance looking into said input primarily capacitive over a predetermined range of frequencies;

the input capacitance of said amplifier with such feedback being very large compared with the combined capacitance of said transducer and the connections thereof to said amplifier in said frequency range whereby the signal appearing at the output of said amplifier is substantially proportional to the quantity of charge appearing at the output of said accelerometer over said frequency range the time constant at the input of said amplifier formed by the resistance looking into said field effect transistor and the total effective capacitance connected thereto having a high value such that said voltage transducing system has a cutoff at a very low subaudio frequency and substantially uniform response at frequencies in a range above said low frequency and up to a very high frequency.

5. In a vibration detecting system as defined in claim 4 wherein:
the time constant at the input of said amplifier formed by the resistance looking into said field effect transistor and the total effective capacitance connected thereto has a relatively high value whereby said vibration detecting system has a substantially uniform response over a frequency range from about 1 c.p.s. to about 10,000 c.p.s.

6. A vibration detecting system as defined in claim 4 wherein said grid element is resistively connected to the output of said transducer.

No references cited.

MILTON O. HIRSHFIELD, *Primary Examiner.*

J. D. MILLER, *Examiner.*

UNITED STATES PATENT OFFICE
CERTIFICATE OF CORRECTION

Patent No. 3,356,868      Dated December 5, 1967

Inventor(s) ROBERT H. COTHER

It is certified that error appears in the above-identified patent and that said Letters Patent are hereby corrected as shown below:

Column 1, line 11, "1964" should be --1963--.

Signed and sealed this 9th day of January 1973.

(SEAL)
Attest:

EDWARD M. FLETCHER, JR.
Attesting Officer

ROBERT GOTTSCHALK
Commissioner of Patents